Patented June 24, 1930

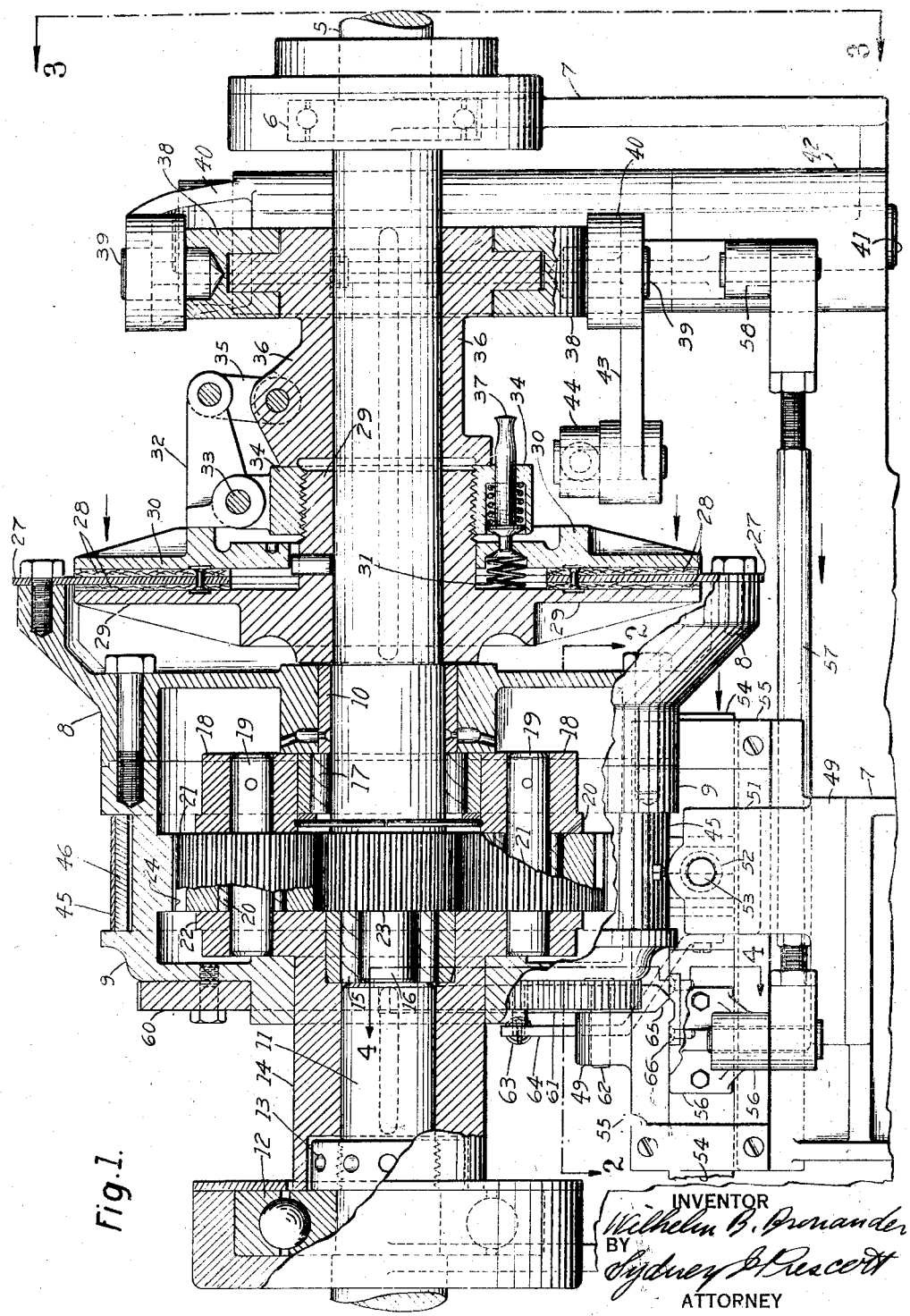

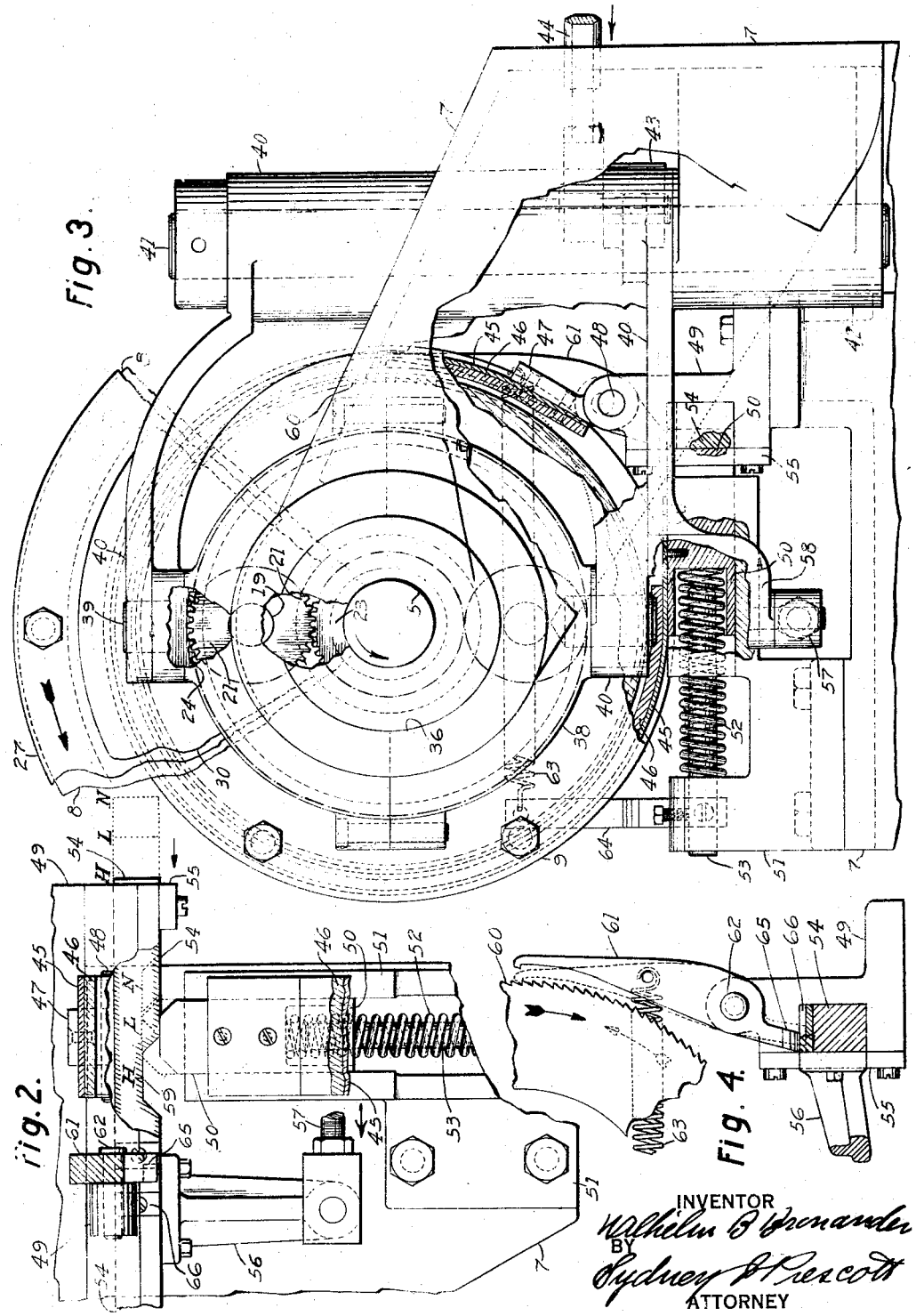

1,765,822

UNITED STATES PATENT OFFICE

WILHELM B. BRONANDER, OF MONTCLAIR, NEW JERSEY, ASSIGNOR TO AMERICAN MACHINE & FOUNDRY COMPANY, A CORPORATION OF NEW JERSEY

VARIABLE-SPEED DRIVE FOR CIGARETTE MACHINES AND THE LIKE

Application filed October 22, 1929. Serial No. 401,499.

This invention relates to improvements in variable drives for automatic machines such as cigarette machines and the like, and particularly to planetary gear drives, designed to enable an operator to start the machine at a low speed and run it at that speed until all working parts have been properly adjusted, and then enable him to change to the higher normal running speed, smoothly, without disturbing the adjustments.

Most multi-speed transmissions, including the planetary type, go through "neutral," i. e. a position in which there is no transmission of power, between one speed and another. In the planetary type in which change of speed is accomplished by selectively holding the master gear stationary, or making it fast to the driving member, this neutral position is due to the fact that it is necessary to loosen the brake band which holds the gear stationary before fully engaging the clutch which makes the gear fast to the driving member. When thus released, the gear tends to go in a direction reverse to that of the driving member, permitting the machine to slow up so that there is a considerable jar or unduly quick acceleration when the machine is thrown into normal high speed operation.

The main object of the invention is to avoid this slippage or interruption of power transmission between speeds. Another object is to provide a simple and rugged multi-speed transmission for automatic machines which will give satisfactory results even despite careless handling.

With these and other objects not specifically mentioned in view, the invention consists in certain constructions and combinations which will be hereinafter fully described and then more particularly pointed out in the claims hereunto appended.

Accordingly, in carrying the invention into effect, there is provided in combination with the master gear of a planetary transmission designed to be selectively held immovable or connected to a driving member to change speeds, means acting on said gear to prevent slippage between the members during said change of speeds, in order to prevent a device driven through said transmission, such as an automatic machine, from losing speed during gear shifting, and thus increasing the shock of changing from one speed to another. In the best constructions, this means will include a ratchet and pawl for preventing movement of the master gear in a direction reverse to that of the driving member. The means referred to may be widely varied in construction within the scope of the claims, for the particular device selected to illustrate the invention is but one of many possible concrete embodiments of the same. The invention, therefore, is not to be restricted to the precise details of the structure shown and described.

In the accompanying drawings in which like characters of reference indicate the same or like parts:

Fig. 1 is a sectional side elevation, with certain parts broken away, of a drive constructed in accordance with the invention;

Fig. 2 is a top view taken on line 2—2 of Fig. 1;

Fig. 3 is a detail end elevation of the drive seen from line 3—3 of Fig. 1; and

Fig. 4 is a detail end view taken on line 4—4 of Fig. 1, showing the ratchet and pawl for preventing reverse movement of the master gear.

Referring to the drawings, a drive member consisting of a motor drive shaft 5 supported by a ball bearing 6 in frame 7 of the machine loosely carries the end cover 8 of the master gear drum 9. A bushing 10 rotatable on shaft 5 is fitted into the hub of cover 8. A driven member 11, which in this case is the main shaft of the cigarette machine, is supported by a ball bearing 12, mounted in a frame 7 and held against a shoulder of shaft 11 by a nut 13, and carries a sleeve 14 fixed to said shaft, which sleeve projects beyond the end of the shaft, and by means of a roller bearing 15, supports the end 16 of the shaft 5.

A roller bearing 17 on the shaft 5 carries a disk 18, which, at diametrically opposite points, has two fixedly mounted axial pins 19 which, on roller bearings 20, carry planet gears 21 and penetrate into holes in the flange 22 of the sleeve 14. The planet gears 21 are in mesh with a sun gear 23, fast on the shaft 5, and with the master gear 24, integral with the drum 9, the hub of which fits loosely on sleeve 14.

To the drum cover 8 is attached clutch disk 27 having friction layers 28, the whole serving as one member of a friction clutch, the other member of which is formed by a disk 29 attached to shaft 5, and by a disk ring 30 slidably carried by the hub of disk 29 and operable axially by a clutch shifting device, disengagement of which from the disk is assisted by springs 31 which press against said disk ring 30.

The clutch shifting device consists of a number of symmetrically arranged bell crank levers 32 pivoted on studs 33, carried by lugs of a collar 34 adjustably fastened to the hub of disk 29, and connected by links 35 with the shift sleeve 36 slidable on shaft 5. The end of a pin 37 resiliently mounted in collar 34 registers with holes drilled into disk ring 30 and serves to lock collar 34 in any adjusted position. Sleeve 36, which revolves with shaft 5, turns in the stationary grooved ring 38 which engages the studs 39 carried by the forked lever 40 mounted on shaft 41 supported by bearing 42 of the machine frame. The lever 40 has an arm 43 on which is pivoted a rod 44 actuated by a control handle conveniently located on the machine.

The master gear drum 9 has a peripheral recess into which is fitted a brake band 45 having a friction lining 46 of felt or other suitable material. One end of this brake band is fastened to a plate 47 pivoted on stud 48 carried by a bracket 49 affixed to the frame 7 (Fig. 3). The other end is attached to a block 50, Figs. 2 and 3, slidable in a bracket 51 on frame 7, and pressed by a spring 52 guided by a fixed rod 53 against a control bar 54 slidably held by plates 55 in a groove of bracket 49. On the control bar 54 is mounted a bracket 56 which is pivotally connected by a rod 57 with a lug 58 of the clutch shifter lever 40. The slide bar has a notch 59 with tapered side surfaces into which fits, with suitable clearance, the tapered end of block 50.

The notch 59 is so positioned in slide 54 that in the neutral position of the clutch shifter, corresponding to the dotted position N of slide 54, in Fig. 2, the end of block 50 rests on the high portion of slide 54 on one side of notch 59, thus compressing spring 52 and releasing brake band 45, so that the master gear 9 is free to turn. As the clutch shifter is advanced into "low", the rod 57 moves slide 54 in the direction of the arrow into position L in which the end of block 50 registers with, and enters into, notch 59, thereby locking the brake band 45 on housing 9. By further advancing the shifter into "high", the slide 54 is carried by rod 57 into the full line position H, in which the end of block 50 rests on the high portion of slide 54 on the other side of notch 59, the taper of the notch having engaged with the taper of block 50 and compressed spring 52 by lifting the block out of the notch, thus releasing the brake band at the same time the clutch 27, 28, 29, 30 is engaged, in such a manner that the action of the clutch overcomes rather than follows the action of the band without freeing the master gear.

To the master gear drum 9 is attached a ratchet 60 adapted to be engaged by a pawl 61 which is pivoted on stud 62 of bracket 49 and urged in engagement with the pawl by a spring 63 hooked to a bar 64 attached to bracket 51. The pawl 61 has a pointed extension 65 which engages with a notched block 66 fastened to control bar 54 in such a position that the extension 65 rests in the notch and thereby allows the spring 63 to hold the pawl in engagement with the ratchet from the time the brake band begins to release on operating the clutch shifter from low to high speed until the clutch is in full engagement. At all other times through engagement of the high parts of the block to either side of the notch with said extension, the pawl is held disengaged from the ratchet preventing operation of the pawl except when needed. Thus operation of the gear shift control element 54 governs, through block 66, the operation of the ratchet.

Referring now to the operation of the device shown, in the disengaged position of the clutch with the brake band released from the gear housing, as is the case with the clutch shifter in neutral position, the motion from shaft 5 is transmitted by the sun gear 23 through the planet gears 21 to the master gear 24, causing the latter to revolve in the reverse direction while the axes of the planet gears, themselves, remain stationary owing to the resistance to rotation of shaft 11, the latter thus remaining at rest. By moving the clutch shifter into "low", with the clutch still disengaged, but with the brake band locked, the motion from shaft 5 is transmitted by the sun gear 23 to the planet gears 21, causing the axes of the latter to travel around the master gear 24 of the then stationary housing 9, thereby driving sleeve 14 by means of the pins 19 and rotating the shaft 11 in the same direction as shaft 5, at a speed reduced from that of shaft 5 in the ratio of the pitch diameters of the housing gear and the sun gear. By shifting the clutch into engagement (as shown by the arrows in Fig. 1), which as described above, releases the brake band from the master gear and during said shift calls into operation the anti-slip pawl 61, a direct coupling between the two shafts is established through the clutch members, master gear drum, master gear, and planetary gear system, the sun, master and planet gears revolving as a unit, bringing the machine into high speed operation without passing through neutral.

What is claimed is:

1. The combination with a planetary gear transmission for connecting driving and driven members, including a master gear designed to be selectively held immovable or connected to the driving member to change speeds, of means acting on said gear to prevent slippage between the members during said change of speeds only, and movable means actuating said last named means.

2. The combination with a planetary gear transmission for connecting driving and driven members, including a master gear designed to be selectively held immovable or connected to the driving member to change speeds, of means acting on said gear to prevent slippage between the members during said change of speeds only, said means including mechanism preventing movement of said gear in a direction reverse to that of the driving member, and movable means actuating said last named means.

3. The combination with a planetary gear transmission for connecting driving and driven members, including a master gear designed to be selectively held immovable or connected to the driving member to change speeds, of means acting on said gear to prevent slippage between the members during said change of speeds, said means including a ratchet and pawl for preventing movement of said gear in a direction reverse to that of the driving member, and movable means controlling said last named means.

4. The combination with a planetary gear transmission for connecting driving and driven members, including a master gear designed to be selectively held immovable or connected to the driving member to change speeds, of means acting on said gear to prevent slippage between the members during said change of speeds, said means including a ratchet and pawl to prevent movement of said gear in a direction reverse to that of the driving member, mechanism for controlling the change of speeds, and a device operated by said mechanism governing the operation of said ratchet and pawl.

In testimony whereof, I have signed my name to this specification.

WILHELM B. BRONANDER.